Sept. 29, 1953     S. B. WESSIC     2,653,672
HAND TRUCK STEP CLIMBING MECHANISM
Filed Oct. 7, 1949     2 Sheets-Sheet 1

INVENTOR,
SYLVESTER B. WESSIC,
By Herbert A. Minturn,
ATTORNEY.

Sept. 29, 1953      S. B. WESSIC      2,653,672
HAND TRUCK STEP CLIMBING MECHANISM
Filed Oct. 7, 1949      2 Sheets-Sheet 2

INVENTOR,
SYLVESTER B. WESSIC,
By Herbert A. Minturn
ATTORNEY.

Patented Sept. 29, 1953

2,653,672

UNITED STATES PATENT OFFICE 2,653,672

HAND TRUCK STEP CLIMBING MECHANISM

Sylvester B. Wessic, Speedway City, Ind.

Application October 7, 1949, Serial No. 120,163

3 Claims. (Cl. 180—8)

This invention relates to hand truck step climbing mechanism, the primary object of which is to provide a device which will lift a hand truck and its load step by step up a flight of steps.

A further important object of the invention is to provide a hand truck step climbing device which can be used on steps of varying sizes without adjustment.

A still further object of the invention is to provide a hand truck step climbing device which will accomplish the above objects in a more facile, economical and efficient manner than has heretofore been employed.

Further important objects and advantages of the invention will become apparent to those skilled in the art from the following description of one particular form of the invention as illustrated in the accompanying drawings, in which.

Like numerals refer to like parts throughout the several views.

Figures 1, 2:
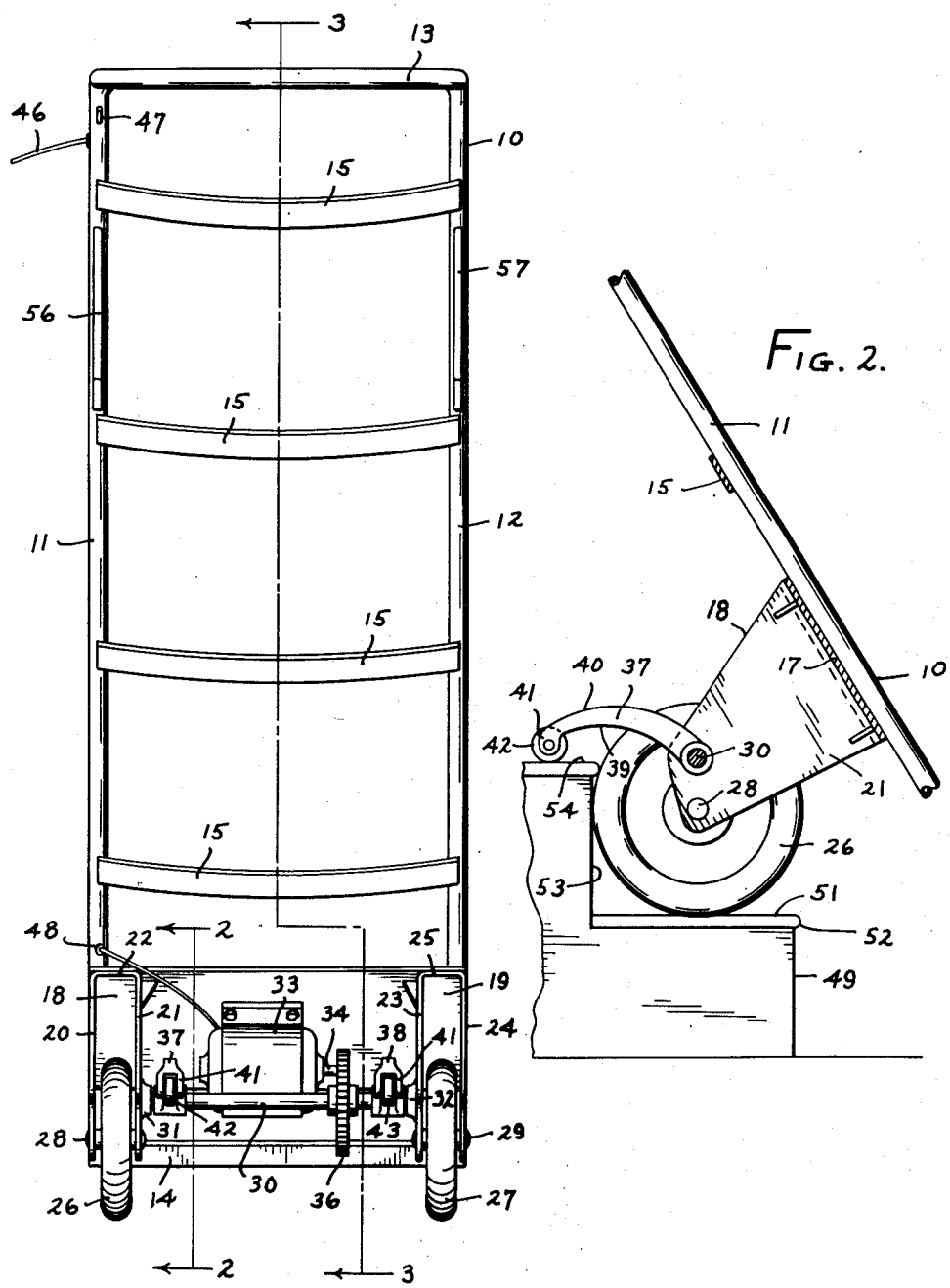
Fig. 1 is a view in rear elevation of a hand truck equipped with mechanism embodying the invention.
Fig. 2 is a view in section on the line 2—2 in Fig. 1.

A hand truck generally designated by the numeral 10 has a rectangular body frame consisting of parallel tubular side rails 11 and 12, a handle 13 integrally connecting the side rails at their top ends, a bottom plate 14 fixed at right angles to the bottom ends of the rails 11 and 12, and cross-pieces 15 connecting said rails intermediate their ends. V-shaped feet 56 and 57 are fixed to the bottom surfaces of the rails 11 and 12 respectively near their upper ends.

A rectangular plate 17 is fixed to the bottom surfaces of the rails 11 and 12 near their lower ends and inverted U-shaped wheel brackets 18 and 19 are fixed on opposite lateral end portions of the bottom surface of said plate 17 to extend downwardly therefrom. Both of these wheel brackets 18 and 19 are substantially identical, the left-hand wheel bracket 18 consisting of side plates 20 and 21 connected by a top web 22 and the right-hand wheel bracket 19 consisting of side plates 23 and 24 connected by a top web 25. Wheels 26 and 27 are revolubly mounted on the pins 28 and 29 respectively, which are carried by the wheel brackets 18 and 19 respectively in horizontal axial alignment.

A horizontal shaft 30 is revolubly mounted in bearings 31 and 32 carried by the bracket plates 21 and 23 respectively spaced rearwardly and upwardly from the axis of the pins 28 and 29, to have its axis of rotation parallel to the axis of the wheels 26 and 27.

Figure 3:
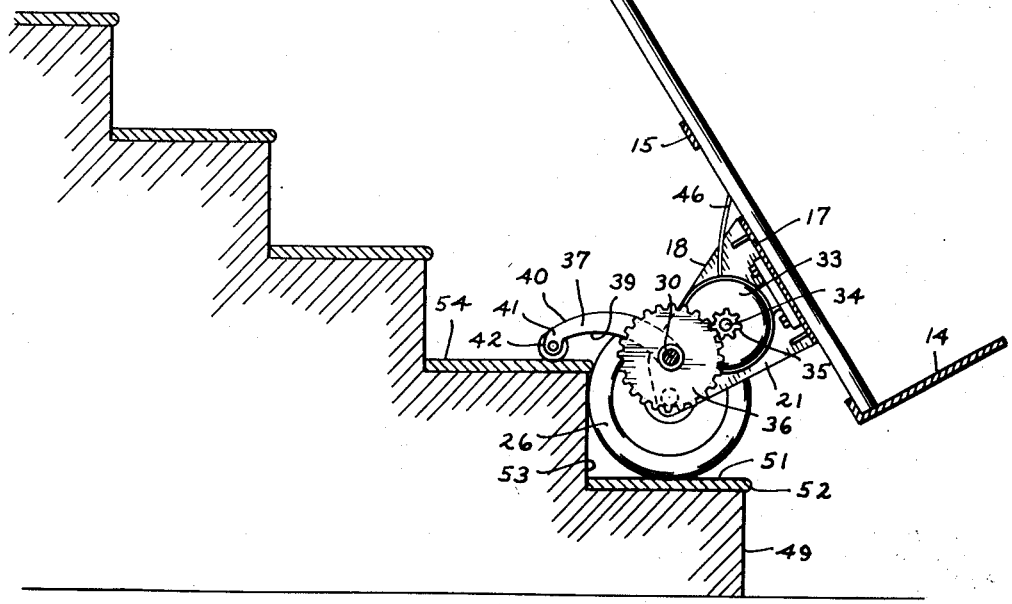
Fig. 3 is a view in section on the line 3—3 in Fig. 1.

An electric motor 33 to drive the shaft 30 is fixed to the bottom surface of the plate 17 in such a manner that its drive shaft 34 has its axis parallel to the axis of the shaft 30. In order to utilize a small motor of relatively high speed, it is necessary to interpose a gear reduction device between the motor and the shaft and this device may assume different designs. Herein, the device is illustrated somewhat diagrammatically by a pinion gear 35 fixed on said drive shaft 34 to be in constant mesh with a larger spur gear 36 fixed on the shaft 30. Referring to Fig. 3, the motor 33 is designed to rotate the drive shaft 34 and the pinion gear 35 in a clockwise direction and thereby to drive the spur gear 36 and the shaft 30 in a counterclockwise direction.

Lift arms 37 and 38 of equal lengths are fixed on the shaft 30 adjacent the bearings 31 and 32 respectively. Referring again to Fig. 3, due to the counterclockwise rotation of the shaft 30 the arms 37 and 38 will revolve in a counterclockwise direction. In other words the outer ends of the arms 37 and 38 will be moving forwardly when rotating under the shaft 30, moving upwardly when rotating in front of the shaft 30, moving rearwardly when rotating above the shaft 30, and moving downwardly when rotating to the rear of the shaft 30. As shown in Figs. 2 and 3 the operating arm 37 has a concave arcuate leading edge 39, a convex trailing edge 40, and a bifurcated end portion 41 extending forwardly of the edge 39 in the direction of rotation of the arm 37. The arm 38 is identical with the arm 37. Both arms 37 and 38 have identical rollers 42 and 43 respectively revolubly mounted in their respective end portions on a common axis of rotation which is parallel to the axis of the shaft 30.

An electric cable 46 enters the side rail 11 near the handle 13, passes through a switch (not shown) which is located inside of the rail 11 and is controlled by the lever 47 which extends outwardly from the under side of rail 11, down through the rail 11 to a hole 48 located just above the plate 17, out through the hole 48, and from the hole 48 directly to the electric motor 33. The outer end of the power line 46 is connected to an electrical power outlet (not shown) when the step climbing mechanism is to be used.

To use the step climbing device, the operating arms 37 and 38 are positioned preferably forwardly of the shaft 30, and the truck 10 is backed up to the steps to be climbed with the wheels 26 and 27 abutting the vertical face 49 of the first step to be climbed. The operator takes a position on the steps facing the truck 10 and grasping the handle 13 to exert an inward pull thereon. In this position the frame of the truck 10 will be at some such angle as indicated in Figs. 2 and 3.

The operator then actuates the electric motor 33 by movement of the switch lever 47 and the operating arms 37 and 38 revolve around and downwardly into contact with the tread 51 of the first step. When the rollers 42 and 43 contact the tread 51 their movement is arrested and continued rotation of the shaft 30 causes said shaft 30 to revolve bodily upwardly in an arc around the axis of the rollers 42 and 43 to move the wheels 26 and 27 onto the tread 51 of the first step. When the wheels 26 and 27 have cleared the lip 52 of the tread 51 the inward pull exerted by the operator on the handle 13 will pull the rollers 42 and 43 and the wheels 26 and 27 inwardly to place the wheels 26 and 27 in abutment with the riser 53 of the next higher step. The rollers 42 and 43 will move forwardly to allow the wheels 26 and 27 to settle down on the tread 51, and then be swung around forwardly, upwardly, and downwardly into contact with the tread 54 of the next higher step where the lifting procedure will be repeated. The same action will be repeated on each successive step until the entire flight has been climbed. In Figs. 2 and 3 the roller 42 is shown in contact with the tread 54 of the second step after the truck has climbed onto the first step.

Referring to Figs. 2 and 3, when the truck 10 is in step climbing position the axis of the shaft 30 is approximately the same distance from the horizontal surface 51 upon which the wheels 26 and 27 are resting as the distance which the tread 54 of the step which the mechanism is designed to climb is from said surface 51. It should be noted that the effective lifting lengths of the arms 37 and 38 are determined by the distance between the axis of the shaft 30 and the axis of the rollers 42 and 43 plus the radius of said rollers 42 and 43 in relation to the radius of the wheels 26 and 27. If the effective length is less than the distance which the axis of the shaft 30 is spaced above the surface 51 by the wheels, the arms 37 and 38 will not completely lift the wheels 26 and 27 onto the tread 54, while if the effective length is greater than the distance which the axis of the shaft 30 is spaced from said surface 51, the truck 10 and its load will be lifted to a greater height than necessary to lift the wheels 26 and 27 to the next higher step and power will be wasted. In order to permit some variation in the angle at which the truck frame is disposed relative to the surface 51, it is desirable that when the frame is disposed at its preferred angle relative to the tread 51 that the axis of the shaft 30 be substantially vertically above the axis of the wheels 26 and 27.

In order that the path of the arms 37 and 38 shall be clear so that the arms can revolve continuously a full 360 degrees around the shaft 30, the axis of said shaft must be spaced from the plate 17 a distance greater than the effective lifting length of the arms 37 and 38. That is to say that the axis of the shaft 30 must be spaced from the plate 17 a distance greater than the distance between the axis of the shaft 30 and the axis of the rollers 42 and 43 plus the radius of the rollers.

It should be noted that the arcuate concave form of the leading edges of the operating arms 37 and 38 is an important feature of this device in that it permits the arms 37 and 38 to reach over the lip of a step at a higher elevation than that of the shaft 30 without contact or hanging up of the intermediate portion of the arms 37 and 38 on the lip. This feature insures that the truck will not be pushed forwardly on its tread while being lifted.

While I have herein shown and described my invention in the one best form as now known to me, it is to be understood that structural variations may be employed without departing from the spirit of my invention, and therefore I do not desire to be limited to that precise form beyond the limitations which may be imposed by the following claims.

I claim:

1. A step climbing hand truck comprising in combination a substantially rectangular frame; a plate fixed to the bottom surface of said frame near its forward end; a pair of inverted U-shaped wheel brackets fixed to opposite lateral ends of said plate; wheels revolubly mounted in each of said wheel brackets, each of said wheels being revoluble about a common axis of rotation; a revoluble shaft journaled in bearings carried by said wheel brackets with its axis parallel to the axis of said wheels; a pair of spaced apart lifting arms fixed on said shaft; a motor fixed on said plate; driving means between said motor and said shaft; said motor being designed to rotate said shaft through said means in a direction such that the operating arms will revolve downwardly when to the rear of the shaft.

2. A step climbing hand truck comprising in combination a substantially rectangular frame; a plate fixed to the bottom surface of said frame near its forward end; a pair of inverted U-shape wheel brackets fixed to opposite lateral ends of said plate; wheels revolubly mounted in each of said wheel brackets, each of said wheels being revoluble about a common axis of rotation; a revoluble shaft journaled in bearings carried by said wheel brackets with its axis parallel to the axis of said wheels; a pair of spaced apart lifting arms fixed on said shaft; a motor fixed on said plate; driving means between said motor and said shaft; said motor being designed to rotate said shaft through said means in a direction such that the operating arms will revolve downwardly when to the rear of the shaft; each of said operating arms having an arcuate concave leading edge and a bifurcated end portion extending forwardly of said leading edge in the direction of rotation of said arm; rollers revolubly mounted in each of said bifurcated end portions, each of said rollers having a common axis which is parallel to the axis of said shaft.

3. A step climbing hand truck comprising in combination a substantially rectangular frame; a plate fixed to the bottom surface of said frame near its forward end; a pair of inverted U-shaped wheel brackets fixed to opposite lateral ends of said plate; wheels revolubly mounted in each of said wheel brackets, each of said wheels being revoluble about a common axis of rotation; a revoluble shaft journaled in bearings carried by said wheel brackets with its axis parallel to the axis of said wheels; a pair of spaced apart lifting arms fixed on said shaft; a motor fixed on said plate; driving means between said motor and said shaft; said motor being designed to rotate said shaft through said means in a direction such that the operating arms will revolve downwardly when to the rear of the shaft; each of said operating arms having an arcuate concave leading edge and a bifurcated end portion extending forwardly of said leading edge in the direction of rotation of said arm; rollers revolubly mounted in each of said bifurcated end portions, each of said rollers having a common axis which is parallel to the axis of said shaft; said shaft being spaced from said plate a distance greater than the combined distance between the axis of the shaft and the axis of the rollers plus the radius of the rollers; said shaft being arranged relative to the wheels so that when the truck is in stair climbing position the axis of the shaft will be substantially vertically above the axis of the wheels; and the over-all length of the arms including the distance between the axis of the shaft and the axis of the rollers plus the radius of the rollers being substantially equal to the distance between the axis of the shaft and the surface upon which the wheels are resting when the truck is in operating position.

SYLVESTER B. WESSIC.

References Cited in the file of this patent

UNITED STATES PATENTS

| Number | Name | Date |
| --- | --- | --- |
| 255,693 | Tauber | Mar. 28, 1882 |
| 1,191,394 | Brown et al. | July 18, 1916 |
| 1,551,127 | Whyel | Aug. 25, 1925 |
| 2,400,824 | Jackson | May 21, 1946 |
| 2,506,292 | Boltson | May 2, 1950 |

FOREIGN PATENTS

| Number | Country | Date |
| --- | --- | --- |
| 187,291 | Germany | June 24, 1907 |
| 577,797 | Germany | July 13, 1932 |